US009478016B2

(12) United States Patent
Huang et al.

(10) Patent No.: US 9,478,016 B2
(45) Date of Patent: Oct. 25, 2016

(54) IMAGE RESTORATION METHOD AND IMAGE PROCESSING APPARATUS USING THE SAME

(71) Applicant: National Taipei University of Technology, Taipei (TW)

(72) Inventors: Shih-Chia Huang, Taipei (TW); Jian-Hui Ye, Taipei (TW); Bo-Hao Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 141 days.

(21) Appl. No.: 14/487,105

(22) Filed: Sep. 16, 2014

(65) Prior Publication Data
US 2016/0078605 A1 Mar. 17, 2016

(51) Int. Cl.
*G06T 5/00* (2006.01)
(52) U.S. Cl.
CPC ..... *G06T 5/003* (2013.01); *G06T 2207/10024* (2013.01)
(58) Field of Classification Search
USPC ........ 382/167, 168, 261, 260, 254, 275, 274
See application file for complete search history.

(56) References Cited

U.S. PATENT DOCUMENTS

| 5,822,453 | A | * | 10/1998 | Lee | ............... | H04N 1/4074 |
| | | | | | | 382/168 |
| 2010/0067823 | A1 | * | 3/2010 | Kopf | ............ | G06K 9/00624 |
| | | | | | | 382/274 |

(Continued)

OTHER PUBLICATIONS

Parthasarathy, Sudharsan, and Praveen Sankaran. "A Retinex based haze removal method." Industrial and Information Systems (ICIIS), 2012 7th IEEE International Conference on. IEEE, 2012.*

(Continued)

*Primary Examiner* — Bhavesh Mehta
*Assistant Examiner* — Narek Zohrabyan
(74) *Attorney, Agent, or Firm* — Jianq Chyun IP Office (57) ABSTRACT

The invention discloses an image restoration method and an imager processing apparatus using the same. The method includes the following steps: receiving a haze image comprising a plurality of pixels; detecting whether a color cast phenomenon occurs on the haze image; if yes, calculating a plurality of Laplacian distribution values respectively corresponding to the color channels; determining a maximum distribution value and a minimum distribution value among the Laplacian distribution values, and generating a self-adaptive parameter by comparing the maximum distribution value and the minimum distribution value; adjusting the transmission map by the self-adaptive parameter so as to generate a adjusted transmission map; calculating a plurality of color parameters respectively corresponding to the color channels according to the Laplacian distribution values; and restoring the haze image by using the color parameters and the adjusted transmission map so as to obtain a restored image.

16 Claims, 5 Drawing Sheets

(56) References Cited

U.S. PATENT DOCUMENTS

| | | | |
|---|---|---|---|
| 2011/0188775 A1* | 8/2011 | Sun | G06K 9/40 |
| | | | 382/274 |
| 2014/0254931 A1* | 9/2014 | Lai | G06T 5/003 |
| | | | 382/167 |
| 2015/0339808 A1* | 11/2015 | Tsuda | G06T 5/40 |
| | | | 382/167 |
| 2016/0071244 A1* | 3/2016 | Huang | G06T 5/002 |
| | | | 382/263 |

OTHER PUBLICATIONS

Guo, Fan, et al. "Automatic image haze removal based on luminance component." Wireless Communications Networking and Mobile Computing (WiCOM), 2010 6th International Conference on. IEEE, 2010.*

Xie, Bin, Fan Guo, and Zixing Cai. "Improved single image dehazing using dark channel prior and multi-scale Retinex." Intelligent System Design and Engineering Application (ISDEA), 2010 International Conference on. vol. 1. IEEE, 2010.*

\* cited by examiner

IMAGE RESTORATION METHOD AND IMAGE PROCESSING APPARATUS USING THE SAME

BACKGROUND

1. Field of the Invention

The invention relates to an image restoration method and an image processing apparatus using the same.

2. Description of Related Art

The visibility of the image captured in inclement weather conditions, such as fog, sand, and mist, will be degraded, since the suspended particles absorb and scatter specific spectrums of light between the observed objects and the camera. These images having degraded visibility lose contrast and color fidelity and are called as haze images. Accordingly, these haze images may directly reduce the performance quality of many systems, such as outdoor object recognition systems, obstacle detection systems, video surveillance systems, intelligent transportation systems and so on. That means, haze removal technique (or dehazing technique) is highly desired in plenty of systems using the haze image or video to achieve different functions. Hence, numerous visibility restoration approaches have been proposed to restore the visibility of the haze images in order to improve system performance in the inclement weather conditions. These visibility restoration approaches can further be divided into three categories, which are additional-information approaches, multiple-image approaches and single-image approaches.

Additional-information approaches restore hazy images by using given scene depth information obtain from either an additional operation or use interaction, such as through user operation to control camera positions and via a given approximate 3D geometrical model. However, these additional-information approaches are not well-suited for real-world application due to limitations placed on the acquisition of scene depth information by unknown geography information and additional user operation. Besides, multiple-image approaches adopt at least two images of the same scene, which are captured by using specific hardware, such as a rotating polarizing filter, to effectively construct the scene depth information and further achieve visibility restoration of incoming hazy images. Unfortunately, the use of these multiple-image approaches usually requires either excessive hardware expense or special devices.

Recently, single-image approaches have been focused on to restore the visibility of hazy images. Single-image approaches are based on either strong assumptions or robust priors, by which haze thickness is estimated by using only a single image. For instance, since a haze-free image possesses evident contrasts compared with a hazy image, the visibility of a hazy image may be restored by maximizing local contrast of the hazy image. However, the images restored by maximizing local contrast often feature serious artifacts along depth edges. Besides, there is another method to restore the visibility of hazy images by estimating the albedo of a scene and inferring the transmission medium, and it is accomplished via the assumption that the transmission medium and the surface shading are locally uncorrelated. Nevertheless, this method usually fails at restoration when the incoming images contain heavy haze formation.

Further, with the exception of sky regions, an outdoor haze-free image features at least one spectrum in the RGB color channels that exhibits a very low intensity value within patches of the image. Inspired by this observation, dark channel prior (DCP) method has been proposed by which to effectively estimate the thickness of haze information and further restore scene radiance. Until now, the DCP method has received the most attention due to its relative success in restoring visibility in hazy images. Based on the dark channel prior method, some improved DCP methods by which to achieve visibility restoration in degraded images captured in poor weather conditions are proposed.

One of the improved DCP methods explores the characteristics of both the dark channel prior and the Multi-Scale Retinex techniques to restore visibility in hazy images. Another one of the improved DCP methods restores visibility through the use of the refined transmission map which can be acquired by using the fast bilateral filter. The other one of the improved DCP methods restores visibility by adopting the three-time subtraction procedure to approximate the minimum value in the dark channel of hazy images. As mentioned above, these DCP-based techniques focus on refining the transmission map and can effectively produce high-quality, haze-free images without generation of any block effects for hazy image captured in foggy weather conditions.

However, these DCP-based techniques mentioned above usually fail in restoring the visibility of images whose haze is the result of capture during sandstorm conditions. This is due to the hindrance of restoration ability by color cast problems and insufficient estimation of haze thickness. Therefore, how to effectively restore haze images captured in any condition has been an important goal to be achieved by the persons skilled in the field.

SUMMARY

Accordingly, the present invention is directed to an image restoration method and an image processing apparatus using the same, which could overcome color cast problem and insufficient estimation of haze thickness.

An image restoration method is introduced herein. The method is adapted to an image processing apparatus. The image restoration method is based on an optical model formed by a transmission map, and the method comprises following steps: receiving a haze image comprising a plurality of pixels, wherein each of the pixels have a plurality of color components corresponding to a plurality of color channels; detecting whether a color cast phenomenon occurs on the haze image; if yes, calculating a plurality of Laplacian distribution values respectively corresponding to the color channels; determining a maximum distribution value and a minimum distribution value among the Laplacian distribution values, and generating a self-adaptive parameter by comparing the maximum distribution value and the minimum distribution value; adjusting the transmission map by the self-adaptive parameter so as to generate a adjusted transmission map; calculating a plurality of color parameters respectively corresponding to the color channels according to the Laplacian distribution values; and restoring the haze image by using the color parameters and the adjusted transmission map so as to obtain a restored image.

In one embodiment of the present invention, the optical model is expressed as:

$$I(x)=J(x)t(x)+A(1-t(x)),$$

wherein $I(x)$ represents the haze image, $J(x)$ represents a haze-free image, A represents the global atmospheric light, x represents pixel location of the pixels, and $t(x)$ represents the transmission map. Besides, the transmission map $t(x)$ is expressed as:

$$t(x)=e^{-\beta d(x)},$$

wherein β represents a scattering coefficient of the atmosphere and d(x) represents scene depth information.

In one embodiment of the present invention, the step of calculating the Laplacian distribution values respectively corresponding to the color channels includes: determining a calculating region of the haze image, wherein the calculating region comprises, a plurality of representing pixels; determining a maximum color component of each of the representing pixels among the color components of each of the representing pixels; respectively comparing the maximum color component with each of the color components of each of the representing pixels to obtain a plurality of color differences of each of the representing pixels, wherein the color differences are respectively corresponding to the color channels; and calculating the Laplacian distribution values respectively corresponding to the color channels base on the color differences.

In one embodiment of the present invention, the calculating region is a region having the highest intensity in the haze image.

In one embodiment of the present invention, the formula for comparing the maximum color component with each of the color components of each of the representing pixels to obtain the color differences of each of the representing pixels is expressed as:

$$\Delta^c(L) = |I^M(L) - I^c(L)|,$$

wherein c is an index of the color channels and $c \in \{r,g,b\}$, $\Delta^c(L)$ represents the color differences respectively corresponding to the color channels, L represents any one of the representing pixels within the calculating region, $I^M(L)$ represents the maximum color component, and $I^c(L)$ represents the color components. The formula for calculating the Laplacian distribution values base on the color differences is expressed as:

$$P(\Delta^c(L) \mid S) = \frac{1}{a} \sum_{L \in S} \exp\left\{\frac{|\Delta^c(L) - \mu|}{\sigma}\right\},$$

wherein $P(\Delta^c(L)|S)$ represents the Laplacian distribution values respectively corresponding to the color channels, μ represents an ideal value of $\Delta^c(L)$, σ represents an optimum parameter, and a represents the number of the representing pixels in the calculating region S.

In one embodiment of the present invention, the self-adaptive parameter is generated via dividing the maximum distribution value by the minimum distribution value, and the adjusted transmission map is generated via taking the self-adaptive parameter as an exponent of the transmission map being a radix.

In one embodiment of the present invention, the step of calculating a plurality of color parameters respectively corresponding to the color channels according to the Laplacian distribution values includes: respectively comparing the maximum distribution value with each of the Laplacian distribution values corresponding to the color channels so as to obtain a plurality of chromatic adaptable parameters for each of the color channels; and generating the color parameters respectively corresponding to the color channels base on the chromatic adaptable parameters.

In one embodiment of the present invention, the formula for generating the color parameters base on the chromatic adaptable parameters is expressed as:

$$\alpha^c = \frac{v^c}{\max_c I^c},$$

wherein c is an index of the color channels and $c \in \{r,g,b\}$, $\alpha^c$ represents the color parameters, $v^c$ represents the chromatic adaptable parameters respectively corresponding to the color channels, $$\max_c I^c$$

represents the maximum color component of each of the color channels in the haze image.

In one embodiment of the present invention, the formula for restoring the haze image by using the color parameters and the adjusted transmission map so as to obtain the restored image is expressed as:

$$J^c(x) = \frac{\alpha^c(I^c(x) - A^c)}{\max(t'(x), t_0)} + \alpha^c A^c,$$

wherein c is an index of the color channels and $c \in \{r,g,b\}$, $I^c(x)$ represents the haze image, $J^c(x)$ represents the haze-free image, $A^c$ represents global atmospheric light, $\alpha^c$ represents the color parameters, t'(x) represents the adjusted transmission map, and the adjusted transmission map is restricted by a lower bound $t_0$.

In another aspect, the invention provides an image processing apparatus for restoring a haze image based on an optical model formed by a transmission map. The image processing apparatus includes a storage unit and a processing unit. The storage unit is configured to store a plurality of modules, and the processing apparatus is coupled with the storage unit to access and execute the modules recorded in the storage unit. The modules include a haze thickness estimation module and an image visibility restoration module. The haze thickness estimation module is executed by the processing unit to receive the haze image comprising a plurality of pixels and detect whether a color cast phenomenon occurs on the haze image. Each of the pixels has a plurality of color components corresponding to a plurality of color channels. If yes, the haze thickness estimation module is executed by the processing unit to calculate a plurality of Laplacian distribution values respectively corresponding to the color channels. The haze thickness estimation module is executed by the processing unit to determine a maximum distribution value and a minimum distribution value among the Laplacian distribution values, and generates a self-adaptive parameter by comparing the maximum distribution value and the minimum distribution value. The haze thickness estimation module is executed by the processing unit to adjust the transmission map by the self-adaptive parameter so as to generate an adjusted transmission map. The image visibility restoration module is executed by the processing unit to calculate a plurality of color parameters respectively corresponding to the color channels according to the Laplacian distribution values and to restore the haze image by using the color parameters and the adjusted transmission map so as to obtain a restored image.

Based on the above description, the embodiments of the present invention provide an image processing method and an image processing apparatus using the same. The method proposed in the present invention could overcome color cast problem and insufficient estimation of haze thickness via the conjunctive utilization of the haze thickness estimation module and the image visibility restoration module. Specifically, the haze thickness estimation module based on the Laplacian-based gamma correction technique is used to avoid insufficient estimation of haze thickness in real-world sandstorm conditions. The haze thickness estimation module could effectively estimate the thickness of haze formation, which subsequently refines the transmission map. The image visibility restoration module based on the Laplacian-based white patch-Retinex technique and refining the transmission map of the optical model is used to effectively overcome color cast problems and recover true scene colors. Hence, a high-quality and haze-free image may be generated by the image visibility restoration module. For images captured under various climatic conditions, the efficacy of visibility restoration of the present invention is superior to the other DCP-based techniques.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Figure 1:
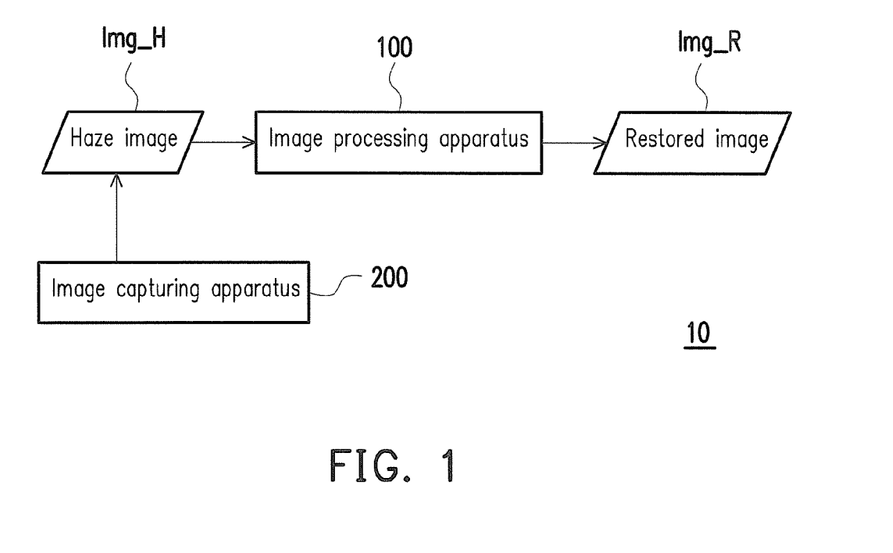
FIG. 1 is a schematic diagram illustrating an image restoration system according to an exemplary embodiment of the invention.

FIG. 1 is a schematic diagram illustrating an image restoration system according to an exemplary embodiment of the invention. Referring to FIG. 1, the image restoration system 10 includes an image processing apparatus 100 and an image capturing apparatus 200 coupled to the image processing apparatus 100. For instance, image restoration system 10 may be an obstacle detection system, a video surveillance systems, etc., which is not limited by the invention. The image capturing apparatus 200 includes a lens and a photosensitive element, the photosensitive element is, for example, a charge coupled device (CCD), a complementary metal-oxide semiconductor (CMOS) or other device, the image capturing apparatus 200 may further include an aperture, etc., which is not limited by the invention. In the embodiment of the invention, the image capturing apparatus 200 may capture at least one haze image Img_H and transmit the haze image Img_H to the image processing apparatus 100. The image processing apparatus 100 may restore the haze image Img_H so as to generate a restored image Img_R with clear visibility and vivid color.

Figure 2:
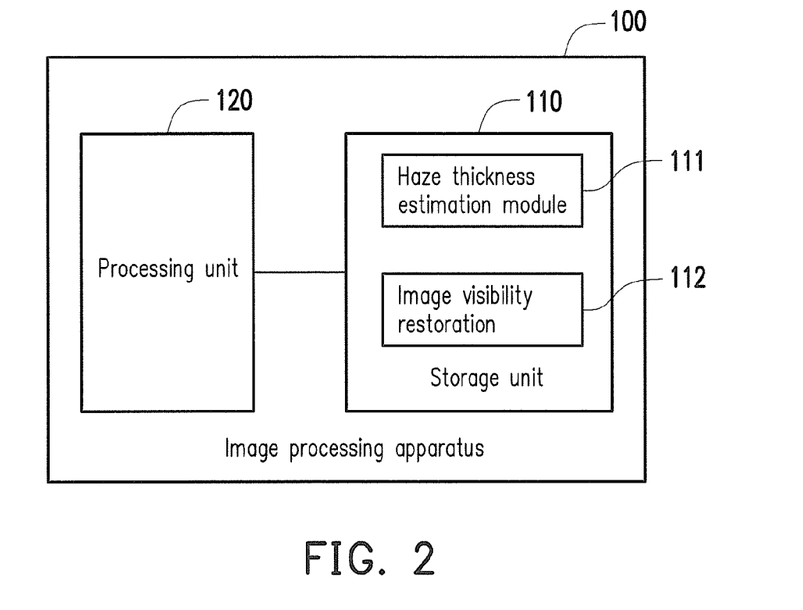
FIG. 2 is a block diagram illustrating an image processing apparatus according to an exemplary embodiment of the invention.

Furthermore, FIG. 2 is a block diagram illustrating an image processing apparatus according to an exemplary embodiment of the invention. Referring to FIG. 2, the image processing apparatus 100 includes a storage unit 110 and a processing unit 120. The storage unit 110 is one or a combination of a stationary or mobile random access memory (RAM), read-only memory (ROM), flash memory, hard disk, or any other similar device, and which records a plurality of modules that can be executed by the processing unit 120. The modules include a haze thickness estimation module 111 and an image visibility restoration module 112. The modules are, for example, programs which may be loaded into the processing unit 120 to execute a function for restoring visibility of the haze images.

The processing unit 120 is one or a combination of a central processing unit (CPU), a programmable general- or specific-purpose microprocessor, a digital signal processor (DSP), a programmable controller, application specific integrated circuits (ASIC), a programmable logic device (PLD), or any other similar device. The processing unit 120 is coupled to the storage unit 110. The processing unit 120 may access and execute the modules recorded in the storage unit 110 to execute an image restoration method proposed in the present invention, which would be introduced later.

In the exemplary embodiment, the haze thickness estimation module 111 is first employed via a combination of the Laplacian distribution model and gamma correction technique to refine the insufficient transmission map. Next, the image visibility restoration module 112 is utilized, which is based on a combination of the Laplacian distribution model and white patch-Retinex theory to estimate the color parameters of the hazy image and further overcome color cast problems in the restoration result. Finally, a restored (haze-free) image may be generated by using the adjusted transmission map and the estimated color parameters to adequately remove atmospheric particles from the hazy image. Details would be provided hereinafter.

Figure 3:
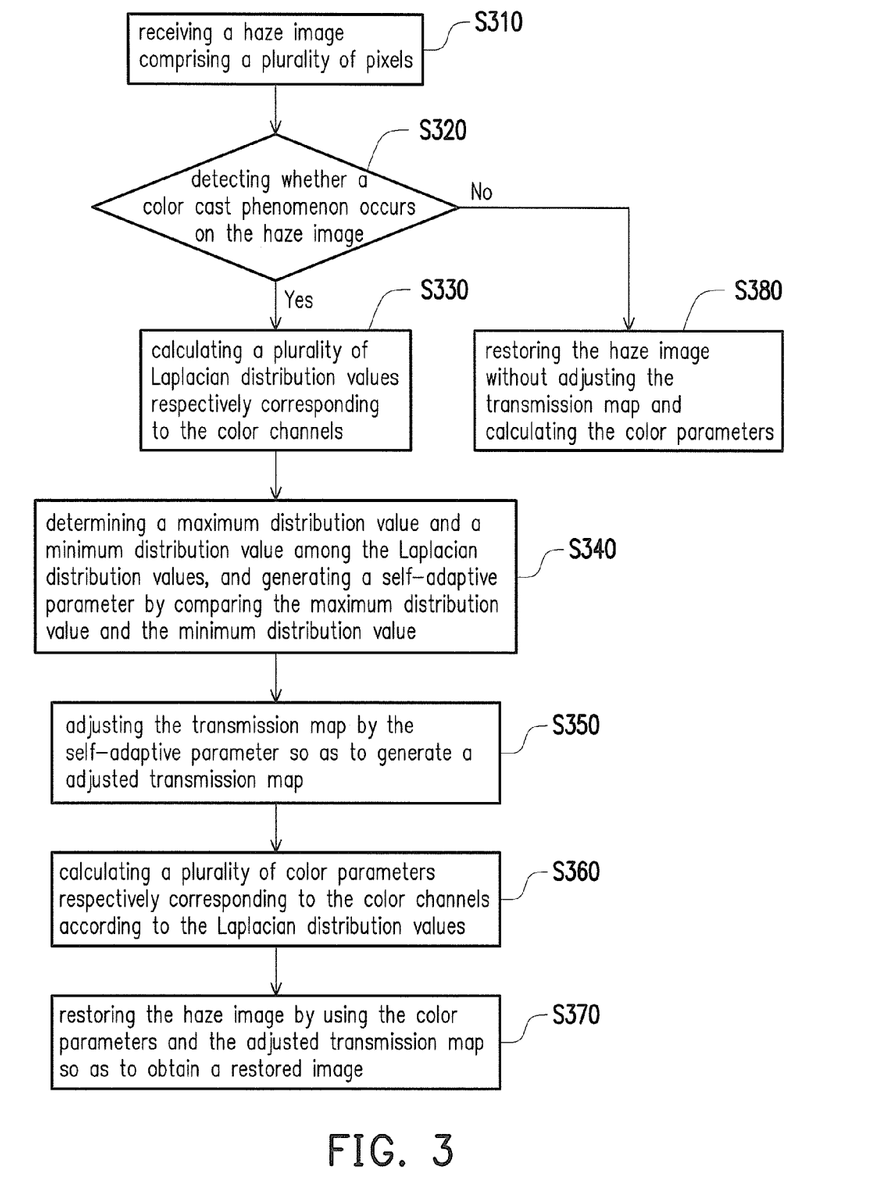
FIG. 3 is a flowchart illustrating an image restoration method according to an embodiment of the invention.

FIG. 3 is a flowchart illustrating an image restoration method according to an embodiment of the invention. The method proposed in the present embodiment may be performed by the image processing apparatus 100 of FIG. 2, and the steps would be discussed with reference to the elements illustrated in FIG. 2.

It should to be noted that first, the image restoration method in the present embodiment is based on an optical model formed by a transmission map. In detail, the optical model may be expressed as Eq.(1).

$$I(x)=J(x)t(x)+A(1-t(x))  \qquad \text{Eq.(1)}$$

In Eq.(1), I(x) represents the haze image captured by the image capturing apparatus 200. J(x) represents the scene radiance which may be regard as a haze-free image. A represents the global atmospheric light. x represents pixel location of the pixels in the images, and t(x) represents the transmission map which is used to describe the non-scattered light between the captured objects in the scene and the image capturing apparatus 200. Note that the first term J(x)t(x) and the second term A(1−t(x)) of Eq.(1) respectively represent the direct attenuation and the airlight. The decay of scene radiance J(x) may be described by direct attenuation, which is subject to medium and scene depth information.

On the other hand, the airlight value usually suffers from scattering and absorption by atmospheric particles, resulting in scene color variation. When the atmosphere considered here is assumed to be homogenous, the transmission map t(x) can be expressed as Eq(2).

$$t(x)=e^{-\beta d(x)}  \qquad \text{Eq.(2)}$$

In Eq.(2), β represents the scattering coefficient of the atmosphere and d(x) represents the scene depth information between the captured objects and the image capturing apparatus 200. In the embodiment, the image restoration method of the invention is on the basis of the optical model expressed as Eq(1), such that a restored image may be generated based on the assumption of the optical model.

Referring to both FIG. 2 and FIG. 3, after the image capturing apparatus 200 captures a haze image toward a scene in a poor visibility environment, the haze thickness estimation module 111 receives the haze image comprising a plurality of pixels (Step S310), wherein each of the pixels has a plurality of color components corresponding to a plurality of color channels. In the embodiment, the color channels may be red (R) color channel, green (G) color channel and blue (B) color channel, such that each of the pixels on the haze image may have red color component, green color component and blue color component. Nevertheless, the color channels are not limited by the invention, the color channels may be implemented in other states. For instance, the color channels may be cyan color channel, magenta color channel and yellow color channel in another embodiment.

The haze thickness estimation module 111 detects whether a color cast phenomenon occurs on the haze image (Step S320). In the present embodiment, the color cast detection technique is practiced to examine whether or not color cast problems exist in the incoming hazy image. In general, an image with a slight color cast possesses a high Laplacian distribution value due to a smaller color variance of the image content, whereas an image with a heavy color cast possesses a low Laplacian distribution value due to the large color variance of its content. The calculation of the Laplacian distribution values respectively corresponding to the different color channels will be interpreted thereinafter. That is to say, whether the color cast phenomenon occurs on the haze image may be detected according to the Laplacian distribution values respectively corresponding to the different color channels, but the invention is not limited thereto. In another embodiment, whether the color cast phenomenon occurs on the haze image may be detected according to other standards.

Figure 4:
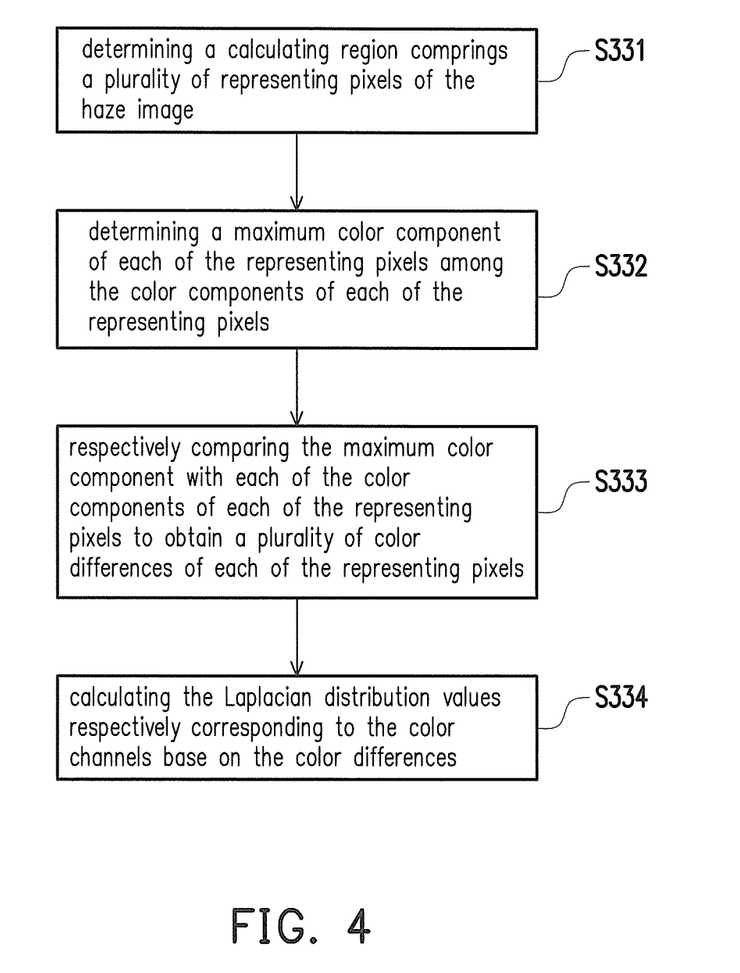
FIG. 4 is a flowchart illustrating a method for calculating the Laplacian distribution values according to an embodiment of the invention.

Hence, if the color cast phenomenon occurs on the haze image is detected, the haze thickness estimation module 111 calculates a plurality of Laplacian distribution values respectively corresponding to the color channels (Step S330). In contrast, if the color cast phenomenon does not occur on the haze image is detected, the image processing apparatus 100 may restores the haze image without adjusting the transmission map and calculating the color parameters (Step S390). Namely, when an incoming haze image exhibits color cast problem, the Laplacian distribution value of each RGB color channel is calculated in the embodiment. More details about calculating the Laplacian distribution values in step S330 are discussed in FIG. 4. With reference to FIG. 4, FIG. 4 is a flowchart illustrating a method for calculating the Laplacian distribution values according to an embodiment of the invention.

First, the haze thickness estimation module 111 determines a calculating region of the haze image, wherein the calculating region comprises a plurality of representing pixels (Step S331). In the present embodiment, the calculating region is a region having the highest intensity in the haze image. Specifically, that calculating region consists of the highest intensity values of the incoming haze image which are selected from the top 0.1 percent brightest pixels in its dark channel. Nonetheless, the calculating region may be selected according to other rules and the size of the calculating region may be may be determined according to the actual application status, the invention is not limited thereto.

Then, the haze thickness estimation module 111 determines a maximum color component of each of the representing pixels among the color components of each of the representing pixels (Step S332). The haze thickness estimation module 111 respectively compares the maximum color component with each of the color components of each of the representing pixels to obtain a plurality of color differences of each of the representing pixels, wherein the color differences are respectively corresponding to the color channels (Step S333). Finally, the haze thickness estimation module 111 calculates the Laplacian distribution values respectively corresponding to the color channels base on the color differences (Step S334).

In simplified way to say, the formula for comparing the maximum color component with each of the color components of each of the representing pixels to obtain the color differences of each of the representing pixels is expressed as Eq.(3).

$$\Delta^c(L)=I^M(L)-I^c(L)|  \qquad \text{Eq.(3)}$$

In Eq.(3), c is an index of the color channels and c∈{r,g,b}. $\Delta^c(L)$ represents the color differences respectively corresponding to the color channels. L represents any one of the representing pixels within the calculating region. $I^M(L)$ represents the maximum color component, and $I^c(L)$ represents one of the color components of the representing pixels.

Base on above, the formula for calculating the Laplacian distribution values base on the color differences is expressed as Eq.(4).

$$P(\Delta^c(L)|S) = \frac{1}{a}\sum_{L\in S} \exp\left\{\frac{|\Delta^c(L)-\mu|}{\sigma}\right\}  \qquad \text{Eq. (4)}$$

In Eq.(4), $P(\Delta^c(L)|S)$ represents the Laplacian distribution values respectively corresponding to the color channels. β represents an ideal value of $\Delta^c(L)$, and σ represents an optimum parameter. a represents the number of the representing pixels in the calculating region S. Moreover, μ and σ may be defined as Eq.(5) and Eq.(6).

$$\mu = \frac{1}{a}\sum_{L \in S} |\Delta^c(L)| \qquad \text{Eq. (5)}$$

$$\sigma = \frac{1}{a}\sum_{L \in S} |I^c(L) - \mu| \qquad \text{Eq. (6)}$$

Figure 5:
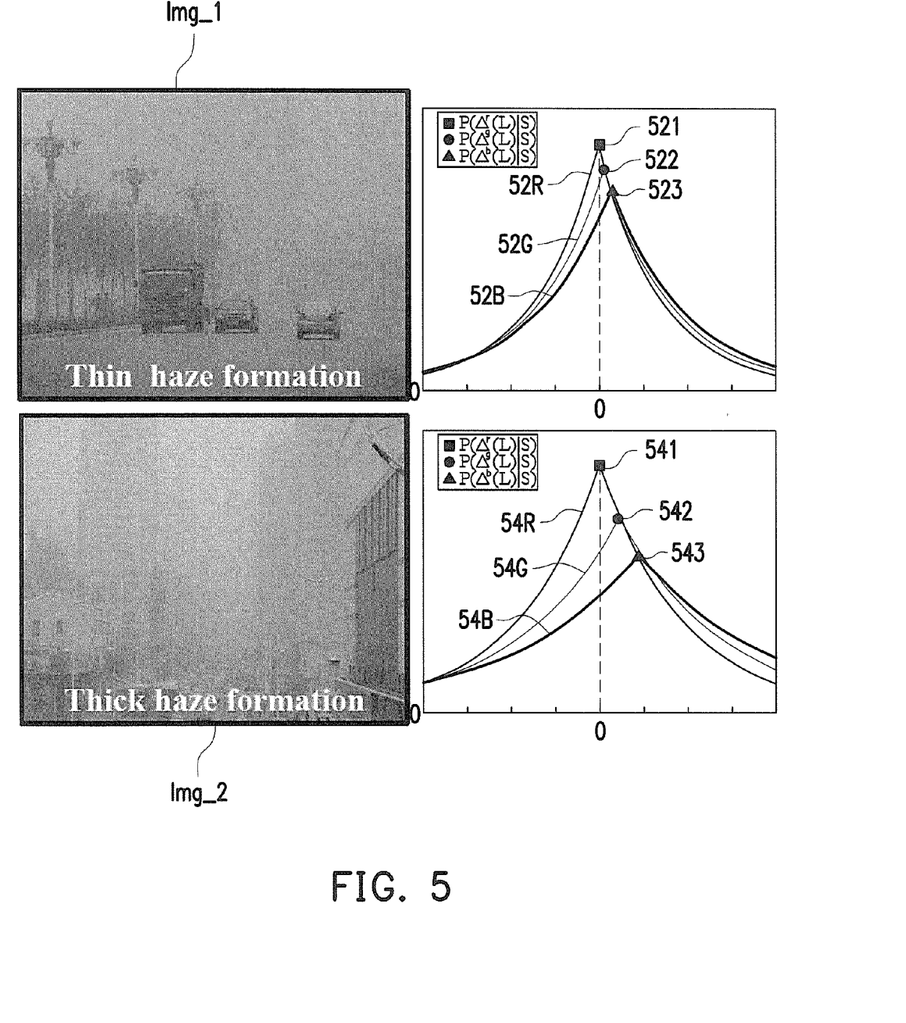
FIG. 5 is an exemplary schematic diagram illustrating an example of Laplacian distribution models corresponding to different color channels.

In order to interrupt the invention more clearly, FIG. 5 is an exemplary schematic diagram illustrating an example of Laplacian distribution models corresponding to different color channels. Referring to FIG. 5, FIG. 5 presents an analysis of the Laplacian distribution models of two images Img_1 and Img_2 captured during sandstorm conditions, and which consequently feature color cast problems. It is assumed that, the hazy image Img_1 represents an image with thin haze formation, and the hazy image Img_2 represents an image with thick haze formation.

In addition, the Laplacian distribution model 52R of the hazy image Img_1 is corresponding to the red color channel, the Laplacian distribution model 52G of the hazy image Img_1 is corresponding to the green color channel, and the Laplacian distribution model 52B of the hazy image Img_1 is corresponding to the blue color channel. Similarly, the Laplacian distribution model 54R of the hazy image Img_2 is corresponding to the red color channel, the Laplacian distribution model 54G of the hazy image Img_2 is corresponding to the green color channel, and the Laplacian distribution model 54B of the hazy image Img_2 is corresponding to the blue color channel. The Laplacian distribution values 521 and 541 are corresponding to the red color channel. The Laplacian distribution values 522 and 542 are corresponding to the green color channel. The Laplacian distribution values 523 and 543 are corresponding to the blue color channel.

As can be seen in the Laplacian distribution models 52R, 52G and 52B, when the Laplacian distribution value 521 of the red color channel and the Laplacian distribution value 524 of the blue color channel possess a lower variation value, the corresponding hazy image Img_1 will feature only a slight color cast. In contrast, the Laplacian distribution values 541 to 543 that possess a large variation value signifies an image that contains serious color cast problems, as may be seen in the hazy image Img_2. That is to say, the Laplacian distribution values 521 to 523 may present the level of color cast in hazy image Img_1. Similarly, the Laplacian distribution values 541 to 543 may present the level of color cast in hazy image Img_2. It should be note that, FIG. 5 is only an exemplary for illustrating the invention, but the invention is not limited thereto.

Back to the flowchart of FIG. 3, after obtaining the Laplacian distribution values respectively corresponding to each color channel, the haze thickness estimation module 111 determines a maximum distribution value and a minimum distribution value among the Laplacian distribution values and generates a self-adaptive parameter by comparing the maximum distribution value and the minimum distribution value for each (Step S340). In the embodiment, the self-adaptive parameter is generated via dividing the maximum distribution value by the minimum distribution value, and the adjusted transmission map is generated via taking the self-adaptive parameter as an exponent of the transmission map being a radix. The haze thickness estimation module 111 then adjusts the transmission map by the self-adaptive parameter so as to generate an adjusted transmission map (Step S350).

Namely, the haze thickness estimation module 111 uses a gamma correction technique with a self-adaptive parameter to refine the insufficient transmission map which may be generated by using DCP-based techniques based on the optical model. Based on the Laplacian distribution values, the self-adaptive parameter may be acquired according to Eq.(7). Base on the principle of comparing the maximum distribution value with the minimum distribution value, Eq.(7) for generating the self-adaptive parameter by comparing the maximum distribution value and the minimum distribution value is expressed as:

$$\gamma = \frac{P(\Delta^M(L)|S)}{P(\Delta^m(L)|S)}, \qquad \text{Eq. (7)}$$

wherein γ represents the self-adaptive parameter, $P(\Delta^M(L)|S)$ represents the maximum distribution value corresponding to one of the color channels, and $P(\Delta^m(L)|S)$ represents the minimum distribution value corresponding to one of the color channels.

Subsequently, the adjusted transmission map can be produced by taking the self-adaptive parameter as an exponent of the transmission map being a radix according to Eq.(8), wherein Eq.(8) for adjusting the transmission map by the self-adaptive parameter so as to generate the adjusted transmission map is express as:

$$t'(x) = l_{max}\left(\frac{t(x)}{l_{max}}\right)^\gamma, \qquad \text{Eq. (8)}$$

wherein t'(x) represents the adjusted transmission map, t(x) represents the transmission map, and $I_{max}$ represents the maximum value of the pixels and could be set to 1. Note that a generated self-adaptive parameter γ that features higher values indicates superior refinement efficacy in the insufficient transmission map t(x). It should be note that, the refinement of the transmission map may solve the problem in conventional restoration method, which is thickness estimation may be influenced by the color cast phenomenon on the haze images.

Figure 6:
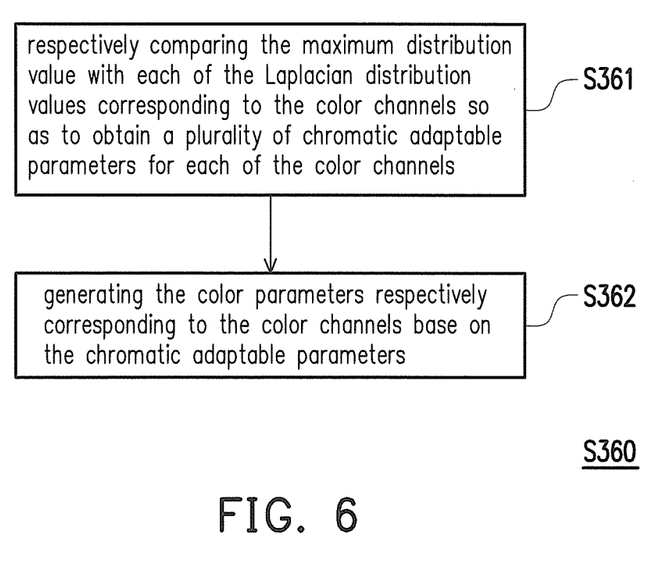
FIG. 6 is a flowchart illustrating a method for calculating a plurality of color parameters according to an embodiment of the invention.

After the Laplacian distribution values are generated during the haze thickness estimation stage, the image visibility restoration may be implemented based on the adjusted transmission map and the Laplacian distribution values calculated in the haze thickness estimation stage. Hence, the image visibility restoration module 112 calculates a plurality of color parameters respectively corresponding to the color channels according to the Laplacian distribution values (Step S360). More details about calculating the Laplacian distribution values in step S360 are discussed in FIG. 6. With reference to FIG. 6, FIG. 6 is a flowchart illustrating a method for calculating a plurality of color parameters according to an embodiment of the invention.

First, the image visibility restoration module 112 respectively compares the maximum distribution value with each of the Laplacian distribution values corresponding to the color channels so as to obtain a plurality of chromatic adaptable parameters for each of the color channels (Step S361). The image visibility restoration module 112 then generates the color parameters respectively corresponding to the color channels base on the chromatic adaptable parameters (Step S362).

Namely, image visibility restoration module 112 estimates the color parameters of the hazy image via the Laplacian distribution values in order to generate the chromatic adaptable parameters and recover scene color. According to the Laplacian distribution values, the chromatic adaptable parameters with higher values may indicate inconsistent distributions of the color channels in the incoming haze image. Based on this characteristic, the chromatic adaptable parameters may be generated according to Eq.(9), wherein Eq.(9) is expressed as:

$$v^c = \frac{P(\Delta^M(L)|S)}{P(\Delta^c(L)|S)}, \quad \text{Eq. (9)}$$

wherein $v^c$ represents the chromatic adaptable parameters respectively corresponding to the color channels. $P(\Delta^M(L)|S)$ represents the maximum distribution value corresponding to one of the color channels, and $P(\Delta^c(L)|S)$ represents the Laplacian distribution values corresponding to the color channels.

For each RGB channel, the color parameters of the hazy image may be generated by employing the white patch-Retinex theory, which is based on the chromatic adaptable parameters. These color parameters may be acquired as Eq.(10), wherein Eq.(10) for generating the color parameters base on the chromatic adaptable parameters is expressed as:

$$\alpha^c = \frac{v^c}{\max_c I^c}, \quad \text{Eq. (10)}$$

wherein c is an index of the color channels and c∈{r,g,b}, $\alpha^c$ represents the color parameters, $v^c$ represents the chromatic adaptable parameters respectively corresponding to the color channels, $$\max_c I^c$$

represents the maximum color component of each of the color channels in the haze image.

Finally, the image visibility restoration module 112 restores the haze image by using the color parameters and the adjusted transmission map so as to obtain a restored image (Step S370). That is to say, a high-quality image may be generated by the image visibility restoration module 112 via the conjunctive utilization of the color parameters and the adjusted transmission map produced by the haze thickness estimation module 111. The color parameters are incorporated into the restoration function for each RGB color channel so as to define a new restoration function Eq.(11), wherein Eq.(11) for restoring the haze image by using the color parameters and the adjusted transmission map so as to obtain the restored image may be expressed as:

$$J^c(x) = \frac{\alpha^c(I^c(x) - A^c)}{\max(t'(x), t_0)} + \alpha^c A^c, \quad \text{Eq. (11)}$$

wherein c is an index of the color channels and c∈{r,g,b}, $I^c(x)$ represents the haze image, $J^c(x)$ represents the haze-free image, represents global atmospheric light, $\alpha^c$ represents the color parameters, t'(x) represents the adjusted transmission map, and the adjusted transmission map is restricted by a lower bound $t_0$.

Please take the hazy image Img_1 and the hazy image Img_2 shown in FIG. 5 as an example again. The self-adaptive parameters and the color parameters of the hazy image Img_1 and the hazy image Img_2 may be obtained after executing of Step S340 to Step S370 illustrated in FIG. 3 on the hazy image Img_1 and the hazy image Img_2. It can be known based on the forgoing interpretation, the self-adaptive parameter and the color parameters of the hazy image Img_1 posses lower variation, since the hazy image Img_1 feature only a slight color cast. In contrast, the self-adaptive parameter and the color parameters of the hazy image Img_2 posses higher variation, since the hazy image Img_2 contain more serious color cast problem. Based on this characteristic, the Laplacian distribution models may be used for examining the color cast effects during sandstorm conditions.

In the example of FIG. 5, due to the positive correlation between serious level of color cast and insufficient estimation of haze thickness in the transmission map, the transmission map of the hazy image Img_1 requires superior compensation efficacy when compared with the transmission map of the hazy image Img_2. In other words, due to the fact that the hazy image Img_2 is affected by the color cast effect more seriously, the self-adaptive parameters γ of the hazy image Img_2 is higher than the self-adaptive parameter γ of the hazy image Img_1 according to Eq.(7) and Eq.(8). Hence, the transmission map of the hazy image Img_2 requires more compensation, and the self-adaptive parameter of the hazy image Img_2 is greater than the self-adaptive parameter of the hazy image Img_1.

Furthermore, by observing the Laplacian distribution models 52R, 52G, 52B, 54R, 54G and 54B, the RGB channels become more inconsistent when color cast problem is more serious under sandstorm condition. In other words, the Laplacian distribution models 54R, 54G and 54B corresponding to RGB channels of the hazy image Img_2 are more inconsistent than the Laplacian distribution models 52R, 52G and 52B corresponding to RGB channels of the hazy image Img_1. Hence, due to the fact that the hazy image Img_2 is affected by the color cast effect more seriously, the color parameters $\alpha^c$ of the hazy image Img_2 possesses higher value for green and blue color channels based on Eq.(9) and Eq.(10) when comparing with the color parameters $\alpha^c$ of the hazy image Img_1.

To sum up, the embodiments of the present invention provide an image restoration method and an image processing apparatus using the same. In the method proposed in the present invention, a novel Laplacian-based visibility restoration approach is presented for restoration of degraded images captured in inclement weather conditions, such as fog and sandstorms. The proposed method adequately removes haze formation and recovers vivid scene color in an image. The insufficient transmission map is refined base on Laplacian-based gamma correction so as to achieve effective estimation of haze thickness. Besides, the method of the invention equalizes each different color channel and subsequently overcome color cast problems in restored images. Consequently, the proposed method may effectively produce haze-free and vivid restoration results for degraded images captured in varied weather conditions.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image restoration method, wherein the image restoration method is based on an optical model formed by a transmission map, and the method comprises:
   receiving a haze image comprising a plurality of pixels, wherein each of the pixels has a plurality of color components corresponding to a plurality of color channels;
   detecting whether a color cast phenomenon occurs on the haze image;
   if yes, calculating a plurality of Laplacian distribution values respectively corresponding to the color channels;
   determining a maximum distribution value and a minimum distribution value among the Laplacian distribution values, and generating a self-adaptive parameter by comparing the maximum distribution value and the minimum distribution value;
   adjusting the transmission map by the self-adaptive parameter so as to generate an adjusted transmission map;
   calculating a plurality of color parameters respectively corresponding to the color channels according to the Laplacian distribution values; and
   restoring the haze image by using the color parameters and the adjusted transmission map so as to obtain a restored image,
   wherein the self-adaptive parameter is generated via dividing the maximum distribution value by the minimum distribution value, and the adjusted transmission map is generated via taking the self-adaptive parameter as an exponent of the transmission map being a radix.

2. The method as claimed in claim 1, wherein the optical model is expressed as:

$$I(x)=J(x)t(x)+A(1-t(x)),$$

wherein I(x) represents the haze image, J(x) represents a haze-free image, A represents the global atmospheric light, x represents pixel location of the pixels, and t(x) represents the transmission map,
   wherein the transmission map t(x) is expressed as:

$$t(x)=e^{-\beta d(x)},$$

wherein β represents a scattering coefficient of the atmosphere and d(x) represents scene depth information.

3. The method as claimed in claim 1, wherein the step of calculating the Laplacian distribution values respectively corresponding to the color channels comprises:
   determining a calculating region of the haze image, wherein the calculating region comprises a plurality of representing pixels;
   determining a maximum color component of each of the representing pixels among the color components of each of the representing pixels;
   respectively comparing the maximum color component with each of the color components of each of the representing pixels to obtain a plurality of color differences of each of the representing pixels, wherein the color differences are respectively corresponding to the color channels; and
   calculating the Laplacian distribution values respectively corresponding to the color channels base on the color differences.

4. The method as claimed in claim 3, wherein the calculating region is a region having the highest intensity in the haze image.

5. The method as claimed in claim 3, wherein the formula for comparing the maximum color component with each of the color components of each of the representing pixels to obtain the color differences of each of the representing pixels is expressed as:

$$\Delta^c(L)=|I^M(L)-I^c(L)|,$$

wherein c is an index of the color channels and c∈{r,g,b}, $\Delta^c(L)$ represents the color differences respectively corresponding to the color channels, L represents any one of the representing pixels within the calculating region, $I^M(L)$ represents the maximum color component, and $I^c(L)$ represents the color components,
   wherein the formula for calculating the Laplacian distribution values base on the color differences is expressed as:

$$P(\Delta^c(L)|S) = \frac{1}{a}\sum_{L\in S}\exp\left\{\frac{|\Delta^c(L)-\mu|}{\sigma}\right\},$$

wherein $P(\Delta^c(L)|S)$ represents the Laplacian distribution values respectively corresponding to the color channels, p represents an ideal value of $\Delta^c(L)$, σ represents an optimum parameter, and α represents the number of the representing pixels in the calculating region S.

6. The method as claimed in claim 1, wherein the step of calculating the color parameters respectively corresponding to the color channels according to the Laplacian distribution values comprises:
   respectively comparing the maximum distribution value with each of the Laplacian distribution values corresponding to the color channels so as to obtain a plurality of chromatic adaptable parameters for each of the color channels; and
   generating the color parameters respectively corresponding to the color channels base on the chromatic adaptable parameters.

7. The method as claimed in claim 6, wherein the formula for generating the color parameters base on the chromatic adaptable parameters is expressed as:

$$\alpha^c = \frac{v^c}{\max_c I^c},$$

wherein c is an index of the color channels and c∈{r,g,b}, $\alpha^c$ represents the color parameters, $v^c$ represents the chromatic adaptable parameters respectively corresponding to the color channels, $$\max_c I^c$$

represents the maximum color component of each of the color channels in the haze image.

8. The method as claimed in claim 1, wherein the formula for restoring the haze image by using the color parameters and the adjusted transmission map so as to obtain the restored image is expressed as:

$$J^c(x) = \frac{\alpha^c(I^c(x) - A^c)}{\max(t'(x), t_0)} + \alpha^c A^c,$$

wherein c is an index of the color channels and c∈{r,g,b}, $I^c(x)$ represents the haze image, $J^c(x)$ represents the haze-free image, $A^c$ represents global atmospheric light, $\alpha^c$ represents the color parameters, t'(x) represents the adjusted transmission map, and the adjusted transmission map is restricted by a lower bound $t_0$.

9. An image processing apparatus, for restoring a haze image based on an optical model formed by a transmission map, comprising:
a memory; and
a processor, coupled to the memory and configured for:
receiving the haze image comprising a plurality of pixels, wherein each of the pixels has a plurality of color components corresponding to a plurality of color channels;
detecting whether a color cast phenomenon occurs on the haze image;
if yes, calculating a plurality of Laplacian distribution values respectively corresponding to the color channels;
determining a maximum distribution value and a minimum distribution value among the Laplacian distribution values, and generating a self-adaptive parameter by comparing the maximum distribution value and the minimum distribution value; and
adjusting the transmission map by the self-adaptive parameter so as to generate an adjusted transmission map;
calculating a plurality of color parameters respectively corresponding to the color channels according to the Laplacian distribution values;
restoring the haze image by using the color parameters and the adjusted transmission map so as to obtain a restored image; and
generating the self-adaptive parameter via dividing the maximum distribution value by the minimum distribution value, and generating the adjusted transmission map via taking the self-adaptive parameter as an exponent of the transmission map being a radix.

10. The image processing apparatus as claimed in claim 9, wherein the optical model is expressed as:

I(x)=J(x)t(x)+A(1-t(x)), wherein I(x) represents the haze image, J(x) represents a haze-free image, A represents the global atmospheric light, x represents pixel location of the pixels, and t(x) represents the transmission map,
wherein the transmission map t(x) is expressed as:

$t(x)=e^{-\beta d(x)}$, wherein β represents a scattering coefficient of the atmosphere and d(x) represents scene depth information.

11. The image processing apparatus as claimed in claim 9, wherein the processor determines a calculating region of the haze image, wherein the calculating region comprises a plurality of representing pixels,
wherein the processor determines a maximum color component of each of the representing pixels among the color components of each of the representing pixels, respectively compares the maximum color component with each of the color components of each of the representing pixels to obtain a plurality of color differences of each of the representing pixels, wherein the color differences are respectively corresponding to the color channels, and calculates the Laplacian distribution values respectively corresponding to the color channels base on the color differences.

12. The image processing apparatus as claimed in claim 11, wherein the calculating region is a region having the highest intensity in the haze image.

13. The image processing apparatus as claimed in claim 11, wherein the processor compares the maximum color component with each of the color components of each of the representing pixels to obtain the color differences of each of the representing pixels according to:

$\Delta^c(L)=|I^M(L)-I^c(L)|$, wherein c is an index of the color channels and c∈{r,g,b}, $\Delta^c(L)$ represents the color differences respectively corresponding to the color channels, L represents any one of the representing pixels within the calculating region, $I^M(L)$ represents the maximum color component, and $I^c(L)$ represents the color components,
wherein the processor calculates the Laplacian distribution values base on the color differences according to:

$$P(\Delta^c(L)|S) = \frac{1}{a}\sum_{L\in S}\exp\left\{\frac{|\Delta^c(L)-\mu|}{\sigma}\right\},$$

wherein $P(\Delta^c(L)|S)$ represents the Laplacian distribution values respectively corresponding to the color channels, μ represents an ideal value of $\Delta^c(L)$, σ represents an optimum parameter, and α represents the number of the representing pixels in the calculating region S.

14. The image processing apparatus as claimed in claim 9, wherein the processor respectively compares the maximum distribution value with each of the Laplacian distribution values corresponding to the color channels so as to obtain a plurality of chromatic adaptable parameters for each of the color channels, and generates the color parameters respectively corresponding to the color channels base on the chromatic adaptable parameters.

15. The image processing apparatus as claimed in claim 14, wherein the processor generates the color parameters base on the chromatic adaptable parameters according to:

$$\alpha^c = \frac{v^c}{\max_c I^c},$$

wherein c is an index of the color channels and c∈{r,g,b}, $\alpha^c$ represents the color parameters, $v^c$ represents the chromatic adaptable parameters respectively corresponding to the color channels, $$\max_c I^c$$

represents the maximum color component of each of the color channels in the haze image.

16. The image processing apparatus as claimed in claim 9, wherein the processor restores the haze image by using the color parameters and the adjusted transmission map so as to obtain the restored image according to:

$$J^c(x) = \frac{\alpha^c(I^c(x) - A^c)}{\max(t'(x), t_0)} + \alpha^c A^c,$$

wherein c is an index of the color channels and c∈{r,g,b}, $I^c(x)$ represents the haze image, $J^c(x)$ represents the haze-free image, $A^c$ represents global atmospheric light, $\alpha^c$ represents the color parameters, t'(x) represents the adjusted transmission map, and the adjusted transmission map is restricted by a lower bound $t_0$.

* * * * *